United States Patent [19]

Cagle et al.

[11] Patent Number: 4,648,088
[45] Date of Patent: Mar. 3, 1987

[54] DISTRIBUTED CONTROL TIME DIVISION MULTIPLEX RING COMMUNICATION APPARATUS

[75] Inventors: George C. Cagle; Steven J. Clendening, both of Plano, Tex.

[73] Assignee: Rockwell International Corporation, El Segundo, Calif.

[21] Appl. No.: 766,471

[22] Filed: Aug. 19, 1985

[51] Int. Cl.$^4$ ............................................... H04S 3/16
[52] U.S. Cl. ........................................ 370/16; 370/88; 371/8
[58] Field of Search ................... 370/16, 86, 88; 371/8

[56] References Cited

U.S. PATENT DOCUMENTS

| 4,527,270 | 7/1985 | Sweeton | 370/16 |
| 4,530,085 | 7/1985 | Hamada et al. | 370/16 |
| 4,553,233 | 11/1985 | Debuysscher | 370/88 |

*Primary Examiner*—Douglas W. Olms
*Assistant Examiner*—Curtis Kuntz
*Attorney, Agent, or Firm*—Bruce C. Lutz; V. L. Sewell; H. Fredrick Hamann

[57] ABSTRACT

A time division multiplex ring comprising a plurality of nodes connected together by interchanged trunks (main and standby paths) in a ring type or closed loop configuration. Each node in the system includes transmitters and receivers on the main and standby paths along with bridging and switching circuits connected to data failure and other failure detection circuits for operating same arranged such that data and alarm signals are transmitted in the first direction on the main path around the closed loop and in an opposite direction on the standby path. The system is arranged such that if a failure occurs only on the main path and the standby path is unaffected, all communications are switched to the standby path. On the other hand, if the failure affects both the standby and main paths, the circuitry is switched to a configuration where the closed loop comprises portions of the standby and main path and the nodes that are adjacent the failure are connected such that the standby path bypasses those nodes whereby there is direct communication between the two nodes adjacent the failure.

7 Claims, 9 Drawing Figures

DISTRIBUTED CONTROL TIME DIVISION MULTIPLEX RING COMMUNICATION APPARATUS

THE INVENTION

The present invention is generally directed towards electronics and, more specifically, directed towards communications. Even more specifically, it is directed towards a closed loop communication system with distributed intelligence and having main and standby loops wherein upon the detection of a plurality of different types of faults in the system, the remaining operable nodes can reconfigure the data and alarm signal transmission into a new closed loop for communication between the remaining operable nodes.

Time division multiplex (TDM) communication systems in the form of various types of networks have been used for a long time. Further, the idea of ring type configuration communication systems having a plurality of nodes (central offices) connected together by means of transmission links (interchange trunks) is also old. The majority of the prior art ring type TDM loops have used centralized control for reconfiguring the communication system upon failure of a transmission link or a node. However, when the centralized control fails, the entire system is down. If the system is configured using a decentralized set of controls with sensing and control mechanisms at each of the nodes, the failure of a given control system does not automatically lead to failure of the entire system.

An example of the closest known prior art for distributed intelligence communication systems may be found in a presentation at the IEEE Global Telecommunications Conference in Atlanta, Ga., Nov. 26, 1984, by Siecor Fiberlan Company of North Carolina.

The material pertinent to the prior art and to telecommunications in general is incorporated by reference in its entirety from this article into the present application.

In spite of the incorporation, a quick summary of the referenced Siecor system is that at least three nodes were connected together in a ring with intelligence at each node for detecting remote alarm signals or local alarm signals. Depending upon the type of signal and status of the node receiving the signals, various switching actions would occur whereby the system was reconfigured to use a standby communication path which normally would send data in an opposite direction around the ring from the main loop. Thus, in each instance of failure, the system would use both the main and standby paths or loops for transmitting data until the failure mode was corrected and then it would revert to using only the main transmission loop for transmitting data between nodes.

The nodes in this system utilize printed circuit cards for each of the separate muldems. In other words, a printed circuit card was used for the transmitter and receiver of the main muldem as well as for the main muldem itself and a separate card was used for the transmitter and receiver of the standby muldem and the standby muldem itself.

If a failure occurred such as the failure of the receiver in the main muldem, the entire system communication would be disrupted when the main muldem printed circuit card was removed for maintenance. Since the mode involved had already reconfigured itself to a first level of standby status, it had no provisions in its reconfiguration algorithm for a second level of reconfiguration. Thus, the entire system would be down for the time necessary to replace the main muldem printed circuit board.

The present invention solves the above problem by reconfiguring to use the standby loop exclusively when only the main loop fails and uses paths in both loops only for a failure of the type whereby both loops are affected such as cutting a cable containing both the main and standby communication paths or failure of power to an entire node. This approach is obtainable by redesigning the nodes and control mechanisms to recognize three different modes of operation, as opposed to the two modes of the referenced Siecor device, and by the forwarding or propagating of standby error signals on the standby path when the node is in a predetermined state.

It is thus an object of the present invention to provide an improved distributed control ring type or closed loop communication system.

Other objects and advantages of the present invention will be ascertained from a reading of the specification and appended claims in conjunction with the drawings, wherein:

DETAILED DESCRIPTION

Figure 1:
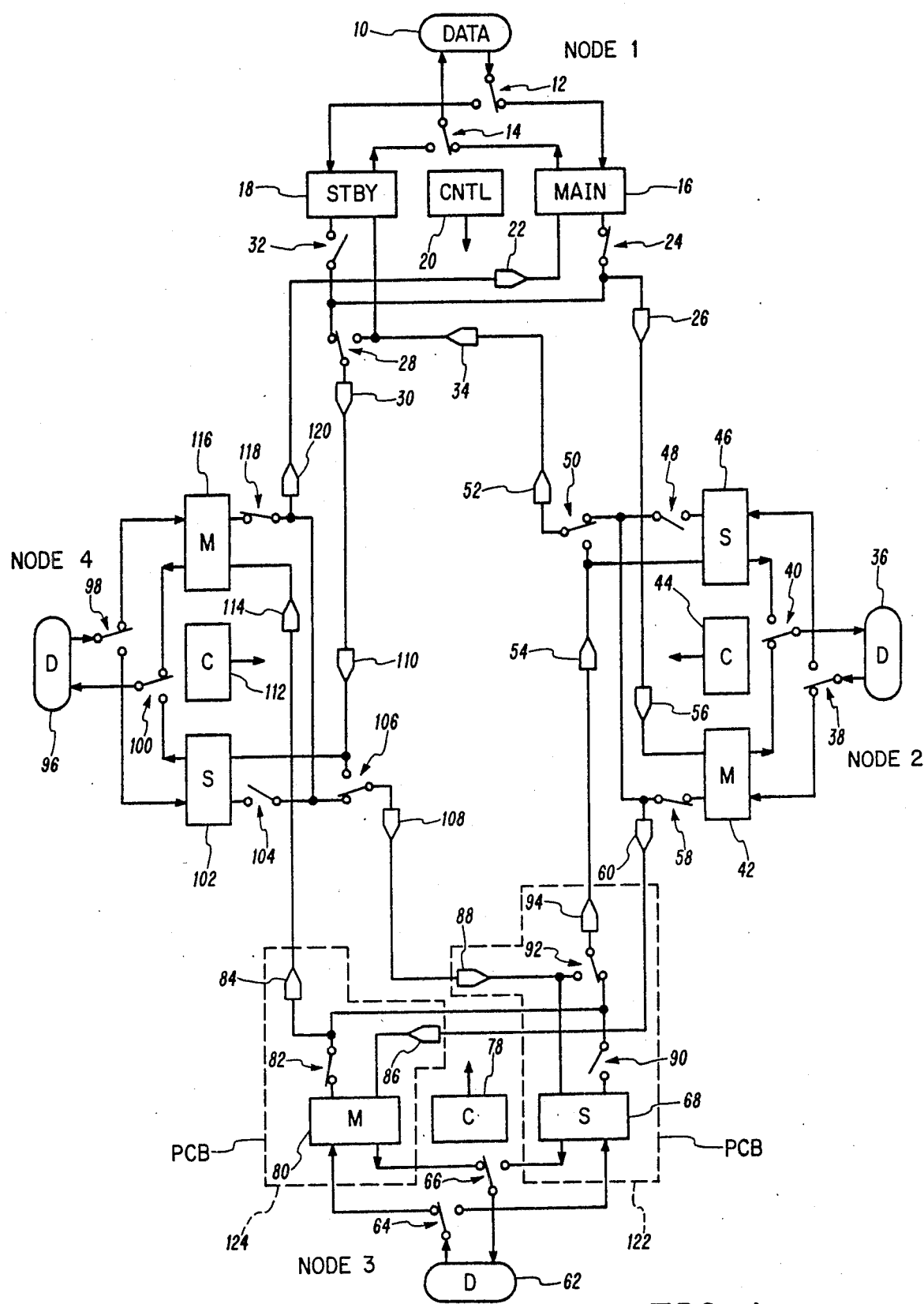
FIG. 1 is a representation of a four node closed loop system operating in the normal mode.

In FIG. 1 a data source 10 operating at a relatively low frequency such as in the DS1, DS1C or DS2 format supplies data to and from a set of switches 12 and 14 in a node 1. As connected the data is supplied to and from a main path muldem or signal path interface means 16 and if the switches were in the opposite connection would be supplying data to and from a standby path muldem or signal path interface means 18. A control block 20 is illustrated having an output arrow indicating that it supplies signals to and from various portions of the muldem and operates to detect the occurrence of various types of alarm signal generating errors such as removal of a printed circuit board, failure of signal being received at the main or standby muldems and failure of various parts. A receiver 22 on a main path is shown connected to provide signals to the main muldem 16. The receiver 22, and others mentioned hereinafter, converts lightwave signals to electrical signals for processing and switching at the node. A switch 24 is connected between an output of main muldem 16 and the input of a main path transmitter 26. The transmitter 26 accomplishes the reverse of receiver 22 in that it changes electrical signals to lightwave signals. The many receivers and transmitters mentioned hereinafter are interfacing means between signal types. The signals are also supplied through a switch designated as 28 to a standby path transmitter 30. A switch 32 is illustrated for connecting the output of the standby muldem to transmitters 26 and 30. A standby path receiver 34 is shown supplying signals to the input of standby muldem 18. If the switch 28 were in the alternate position, signals would be supplied directly from receiver 34 to transmitter 30. Other data sources, such as 36, 62 and 96 in nodes 2, 3 and 4, respectively, are merely labeled D. Other standby muldems, such as 46, 68 and 102 are merely labeled S. The control blocks 44, 78 and 112 are labeled C, while the main muldems 42, 80 and 116 are labeled M. Other circuitry corresponding to that in node 1 are labeled with numbers as shown in nodes 2, 3 and 4, including all the various switches, receivers and transmitters. In addition, in node 3, a printed circuit board or card 122 is illustrated as including the standby muldem 68 and receiver 88 and transmitter 94 as well as switches 92 and 90. Although shown in this manner, the printed circuit board may include more or less circuitry. As illustrated, a further printed circuit board 124 includes not only the main muldem, but the receiver 84 and transmitter 86 and the switch 82.

Figure 2:
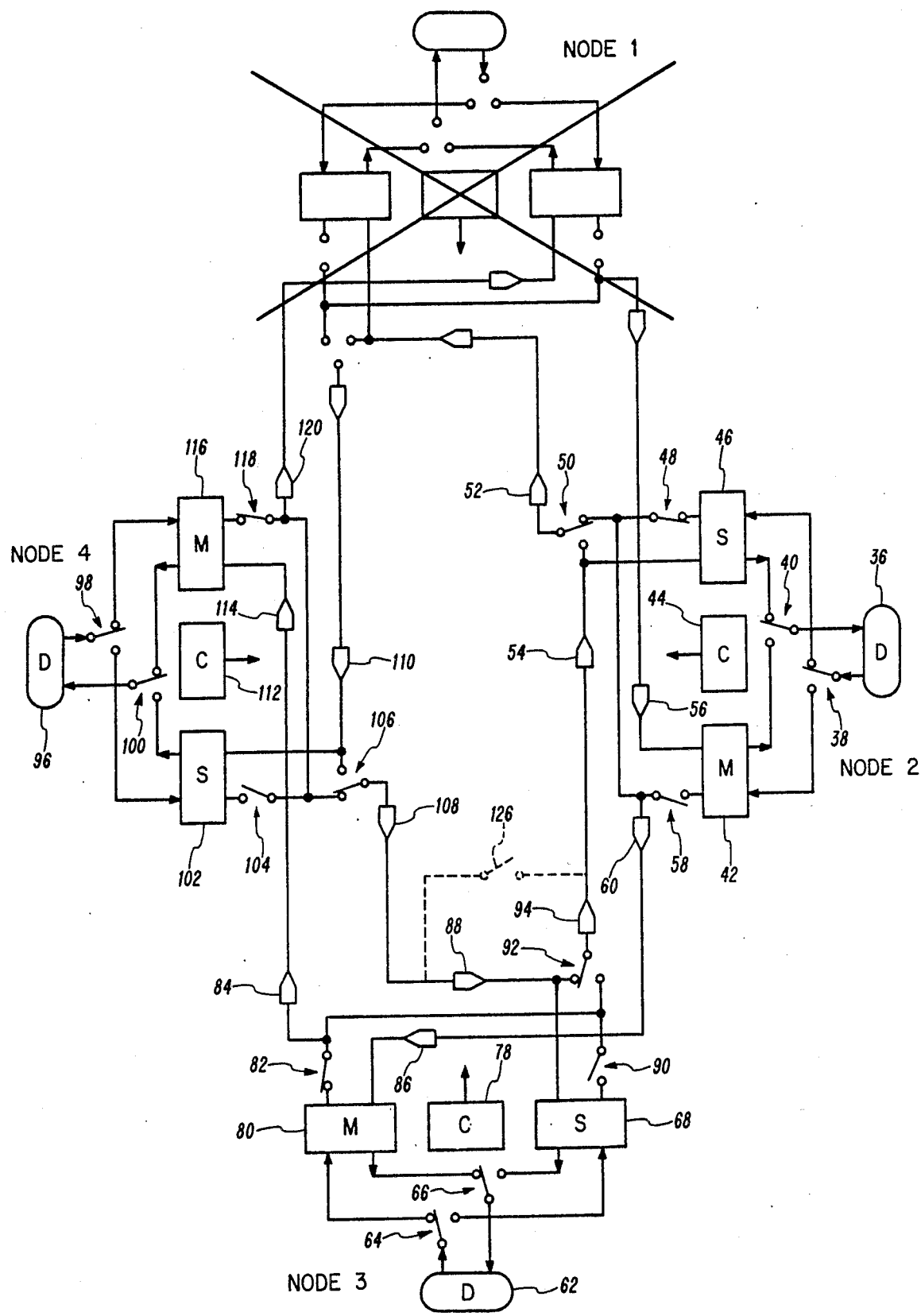
FIG. 2 is a representation of the system of FIG. 1 with one of the nodes completely failed.

FIGS. 2 through 5 have the same designations as the corresponding parts in FIG. 1 with the only change being the indication showing the removal of operability of various portions of the communication loop, and the alteration of some of the switches in accordance with attempts by the control circuits to maintain an operational system of the remaining parts with the exception of a bypass switch 126 shown in FIG. 2, to show that optionally the bypass of the standby muldem may be accomplished by a direct connection from input of the standby receiver 88 to the output of the standby transmitter 94. Such a direct bypass would eliminate possible problems of operability of the associated receiver 88 and transmitter 94.

Figure 6:
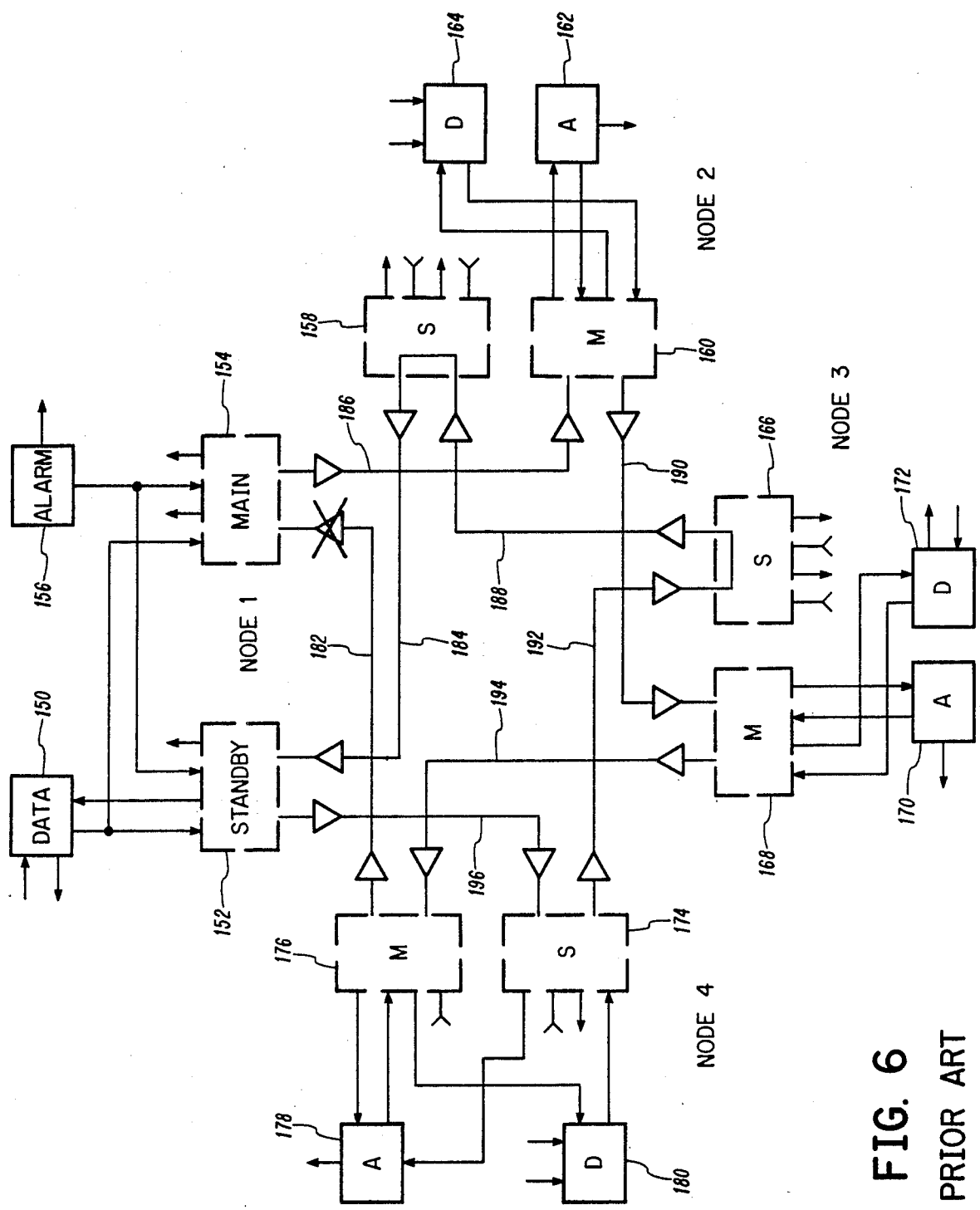
FIG. 6 is an illustration of a circuit used in the prior art for the condition described that the prior art could not handle since the failure occurred on the main receive muldem of node 1 and in the prescribed configuration there would still be transmission of data on the main transmit path.

In FIG. 6, a circuit based on the referenced disclosure is shown and labeled as prior art to help illustrate the differences between the prior art concept and the present concept. In FIG. 6, a data source 150 is shown supplying signals to a standby muldem 152 and to a main muldem 154 with an alarm block 156 performing the functions of the control circuit of the present invention. Other standby and main muldems in each of nodes 2, 3 and 4 along with data sources and alarm blocks are numbered as shown. The various nodes are connected together by transmitters and receivers and transmission links also designated as shown. It may be further ascertained from the drawing that the standby muldems in nodes 2 and 3 have been connected so that the signals incoming to them are directly connected to the output or in other words placed in a loopback or bypass condition. The signals in the nodes 1 and 4 are reconfigured so that they transmit on the main muldems, but only node 1 receives on the standby muldem.

Figure 7:
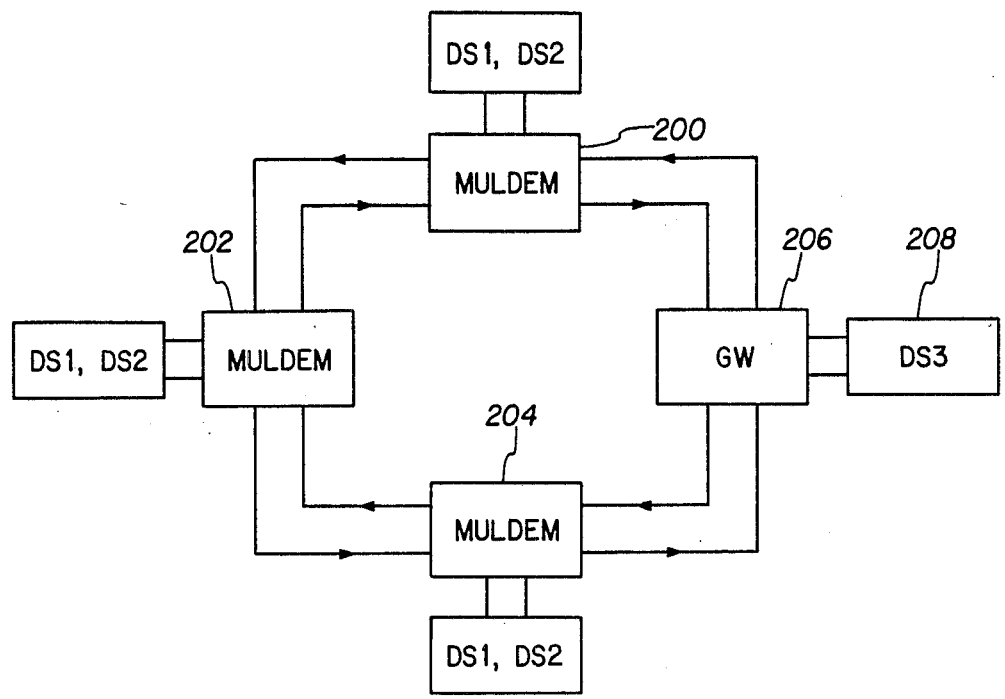
FIG. 7 is a block diagram of a plurality of nodes connected to a gateway wherein the closed loop can communicate at the data bit rate of the closed loop.

In FIG. 7, three muldems 200, 202 and 204 are connected in a ring relationship with a block 206 labeled GW for gateway. Each of the muldems is connected to DS1, DS1C or DS2 type interface equipment and therefore extract a small number of channels from the DS3 high data rate path being passed around the loop. The gateway unit 206 on the other hand extracts the entire DS3 signal and sends it out to interface equipment and receives back a similar high data rate path of signals. The gateway unit 206 selects the appropriate data path which typically is the main loop but in certain failure situations would retrieve the data from the standby loop. As far as the other muldems are concerned, the gateway unit 206 is exactly like and looks like any other muldem unit. Since the loop of FIG. 7 operates at the same frequency as the DS3 load 208, the gateway 206 is primarily an interface unit for converting the lightwave signals of the ring to electrical signals used by the DS3 equipment 208 without a change in frequency. The alarm signals are not passed to the DS3 equipment 208. This is consistent with the operation of the muldems which also do not pass any of the alarm signals to the connected equipment marked DS1, DS2. While the connected equipment is only marked DS1, DS2, the connected equipment could also include communication links operating at DS1C data format and frequency as well as any other format and frequency desired.

Figure 8:
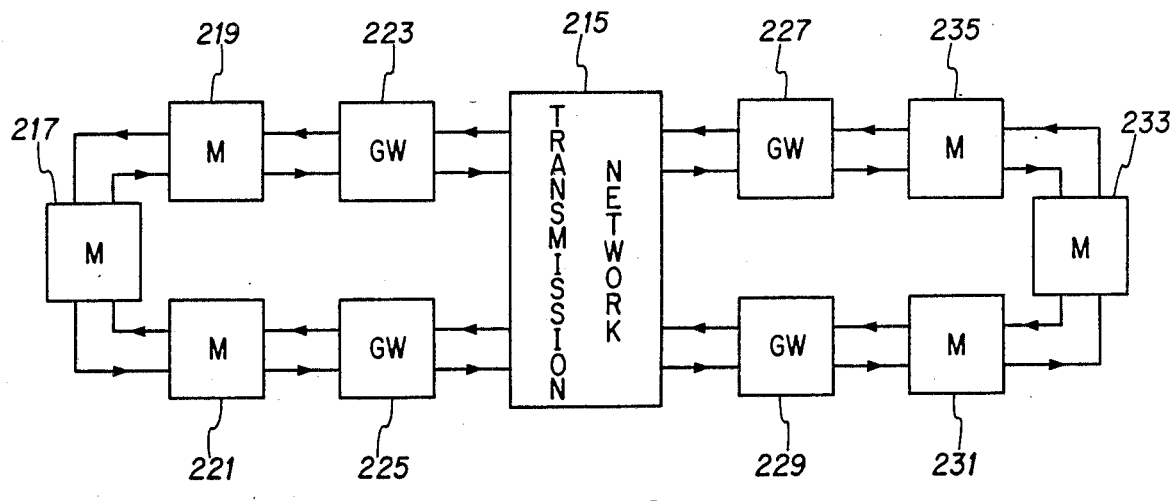
FIG. 8 is a system whereby a switch is used to connect two or more partial loops together to make one grand loop.

In FIG. 8, a central transmission network unit 215 is shown having the capability of being connected to many different loops, only two of which are shown. One partial loop including muldems 217, 219 and 221 are shown connected to the switch 215 by gateway units 223 and 225. A further partial ring comprising gateway units 227 and 229 connected to muldems 231, 233 and 235 are also shown. These gateway units are different from gateway unit 206 in FIG. 7, in that the alarm bits are passed through to the transmission network 215 so that they may be used by other portions of a loop. Thus, the alarm bits which might be generated by muldem 217 would be passed by gateway 223 to gateway 227 and on to other muldems such as 235, etc. as long as switch 215 connected these two partial loops together. The switch 215 could be used to connect the partial loop including muldem 217 to a further partial loop, not shown, or could merely have a loopback connection to include only the muldems shown on the left side of FIG. 8 as one communication loop.

Figure 9:
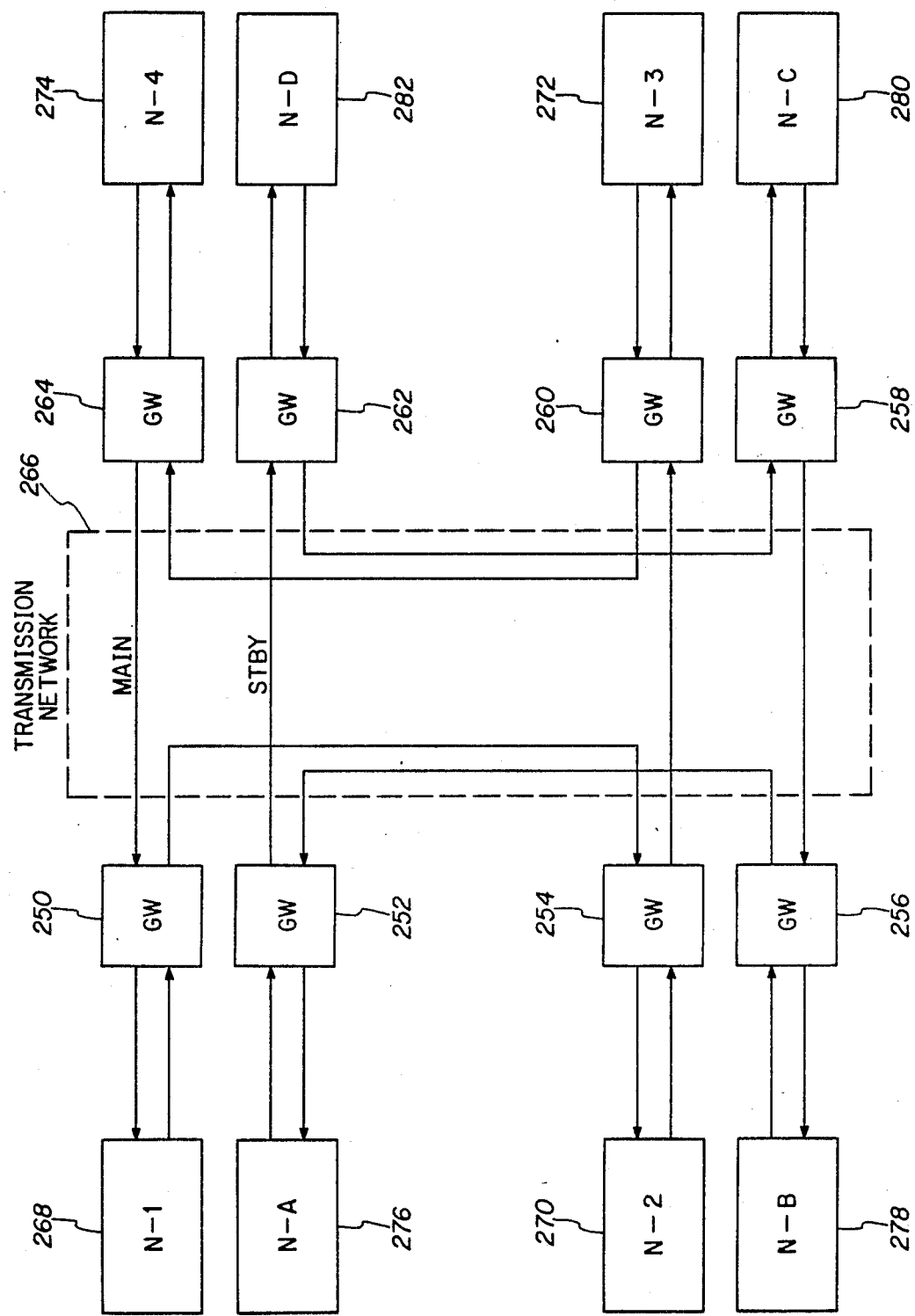
FIG. 9 is a system whereby a gateway is used to connect each of a plurality of standby muldems and each of a plurality of main muldems through a transmission network whereby any number of nodes can be configured to form the overall loop each having its main and standby paths.

In FIG. 9, a plurality of gateway units 250, 252, 254, 256, 258, 260, 262 and 264 are shown. Each of these gateway units pass alarm bits through the gateway from input to output and back. Each of these gateway units is connected to a transmission network, generally designated as 266. Each of the gateway units has a single muldem connected thereto. Each of the blocks 268, 270, 272 and 274 represents a main muldem for nodes 1 to 4, while each of the units 276, 278, 280 and 282 represent standby muldems for each of these four nodes.

Although a primary use of the inventive concept and the preferred embodiment illustrated involves the alteration of signals from lightwave in the main portion of the loop to electrical in each of the nodes, and although multiplexers are typically used to alter the frequency from the high frequency used in the lightwave portion to a much lower frequency for users and a change in multiplexing format, such as a change from DS3 to DS1, DS1C or DS2, the concept does not require such change in the communication signal type and could be electrical, lightwave or microwave throughout, and thus the transmitters and receivers would not be required. Further, the loads or users could use exactly the same data format as the main ring and, thus merely some type of signal interfacing drop and insert capability would be required at each of the nodes, rather than multiplexers and demultiplexers. Such an example of this is given by the gateway unit 206 of FIG. 7. Further, the concept applies to systems having two or more nodes connected together to a theoretically unlimited number of nodes.

OPERATION

Reference will first be made to FIG. 1, which illustrates the normal connection of the apparatus switches when there are no failures.

In a ring network in which channels are inserted or dropped at each node of the ring using the above-described type of equipment, the state of the art approach is to use the drop/insert configuration. In other words, each of the data references 10, 36, 62 and 96 are dropping data to a user and inserting data from a user into the main loop network. In order to ensure that the transmission between nodes is reliable, a redundant transmission scheme is often used employing a so-called one-by-one protection approach. Such an approach contemplates that in each node, channels are dropped and inserted using back-to-back multiplexers with drop-/insert and patching through of channels as desired to serve the required capacity of the equipment located at each node. Outputs of each multiplexer are transmitted through redundant paths by bridging the signal at the transmit end. A channel is selected at the receive end via a protection switch. In reference to FIG. 1, it will be noted that the output of the main muldem 16 supplies signals on the main loop through transmitter 26 and, via switch 28, supplies signals to the inner or standby loop via transmitter 30. As the switches are configured, however, only the main muldem 16 receives data at the receiver and this is shown via receiver 22. The receiver 34 is connected to the standby muldem 18, but this data is not transmitted to the drop and insert data device 10 since switch 14 is in a position that this cannot happen. The other nodes 2 through 4 are similarly connected.

With this type approach, the failure of a transmitter or receiver or an entire communication path for one of the main or standby lines will not result in an outage. However, a loss of both communication paths (due to a cable cut or other path interruption), between nodes will result in an outage. To protect against such an outage without the problems associated with an elaborate central control node, the referenced Siecor approach was originated. FIG. 6 illustrates the connection of various nodes resulting from an outage of a receive transmitter in one of the communication lines for the main path. As outlined in the referenced article, the Siecor approach followed certain rules. One is that the standby unit, such as 158 in FIG. 6, can be altered to a signal bypass or signal bridging mode upon receipt of appropriate alarms. A second is that only the standby muldem can be reconfigured to this mode. Third, any given node can detect or generate several different alarm conditions. Fourth, the node may have a local alarm on either the main or standby path. Alternately, the node could have a remote alarm propagated from an upstream node on the main path. This alarm is transmitted by overhead bits in the data stream and is referred to either as X bits or alarm bits. Also, alternately, the remote alarm could be received on the standby path. The combination of alarms at each node controls the bypass function through the node alarm software whereby a set of rules is followed. Primarily, the Siecor approach is that the nodes always know which path is providing information, standby or main, and what the status of that path is. Fifth, while remote alarms may be received on either the main or standby path, only those alarms received on the main path are propagated or repeated to other downstream nodes. Sixth, any node which has only a remote alarm indication on the main path, will force the bypass to occur on the standby path. And, finally, nodes that have any other alarm condition, whether it be a single alarm, such as a single local alarm, or a combination of alarms, such as a remote alarm on both main and standby paths, will not force the bypass function on the standby path. Under this set of rules, the two nodes 2 and 3 are changed to a loopback condition, and since the alarm occurred in node 1, it sends a local alarm on the standby path to node 4 to maintain it in its original condition before the alarm.

Since the failure condition of FIG. 6 only affected the receipt of signals from line 182 by main unit 154, signals may be output by either the standby muldem 152 or the main muldem 154, and still arrive at node 2 on the main path. This is because as mentioned before the two transmitters are tied together. However, as designed by Siecor, the signals output on standby unit 154 are passed through the main muldem transmitter and passed via lead 186 to the main muldem 160. These signals then continue around the loop via lead 190 to node 3 and then via lead 194 to node 4. Since signals can no longer be transmitted via lead 182, they are then passed out the transmitter side of the standby muldem 174 and bypassed through the two standby units 166 and 158 to get back to node 1 via the standby receive input connected to lead 184. Although the loop is somewhat convoluted, it provides a usable system.

If when the unit is in the configuration shown in FIG. 6, the repairman attempts to remove a printed circuit card containing both the muldem 154 and the defective receiver as well as the presently operating transmitter connected to lead 186, the system is disrupted until the main printed circuit board is replaced with a new unit and initialization procedures are completed. It is an attempt to overcome the problems of system operation during repair procedures of the Siecor system that initiated the concept of the present invention.

The present invention uses main and standby alarm status terminology. In some places in the specification and, in particular, in the pseudocode presented infra, the term X-bit 0 represents the main alarm status bit and X-bit 1 refers to standby alarm status bit. However, in view of the possible confusion with the logic value of the bits themselves, for the most part, the terminology main and standby alarm status bits will be used. Although not pertinent to the concept of the invention, the present idea was developed for use in sending lightwaves modulated in accordance with the data around the main and standby loops. The lightwaves are sent around the main loop in one direction and around the standby loop in the opposite direction. The nodes then act as interfaces between the exchange of lightwave data and electrical signal data. As mentioned previously, each node in the network is independent and accepts control information from its associated neighbor node via a dedicated communication portion of the system. These are basically overhead bits and are not part of the data. To operate the present system, each of the nodes can operate in either (1) a normal mode, (2) a local mode, or (3) a remote mode. The operation in the normal mode signifies that that node has not detected any local or remote alarms. Operation in the local mode indicates that that node was in the normal mode and that a receive alarm signal was detected by either the main or the standby muldem. A node operating in the local mode will ignore remote control signal attempts to switch as received from other nodes. Operation in the remote mode is established from a normal mode when the node receives a main alarm status detected via the main muldem. The node when in this remote mode will ignore switching attempts from any secondary alarms such as a local alarm.

The table below, labeled Table 1, lists the various combinations of the main and standby alarm status signals being in a logic state along with the function performed by a node receiving the indicated alarm status.

TABLE 1

| Main Alarm Status | Standby Alarm Status | Ring State | Function |
| --- | --- | --- | --- |
| 0 | 0 | Normal | |
| 1 | 0 | Remote | Switch to standby |
| 0 | 1 | Remote | Arm loop through |
| 1 | 1 | Remote | Loop through standby |

The processing rules used by the present invention are
1. If a node is operating in the local mode, the node will inhibit any remote control attempts.
2. A receive alarm on the main muldem of a node will cause a switch to the standby muldem when the node is in a local mode.
3. The main path alarm status bit is detected only by the main muldem.
4. The standby alarm status bit is detected only by the standby muldem.
5. The main alarm status bit is set to a logic 1 when a receive alarm is detected by the main muldem of a node. In order for the node to process this bit, it must have been in the normal mode at the time.
6. The standby alarm status bit is set to a logic 1 when a receive alarm is detected on the standby muldem of a node. The node must have been in a local mode already to process this standby alarm signal.
7. If the node is already in the remote mode, the node will inhibit any local alarm switching attempts.
8. When a node is in the remote mode, incoming alarm status bits, whether standby or main, are propagated to the next node.
9. The main alarm status bit is used for arming the "loop through" feature of the standby muldem of a node and will not cause the node to enter the remote mode.

Figure 3:
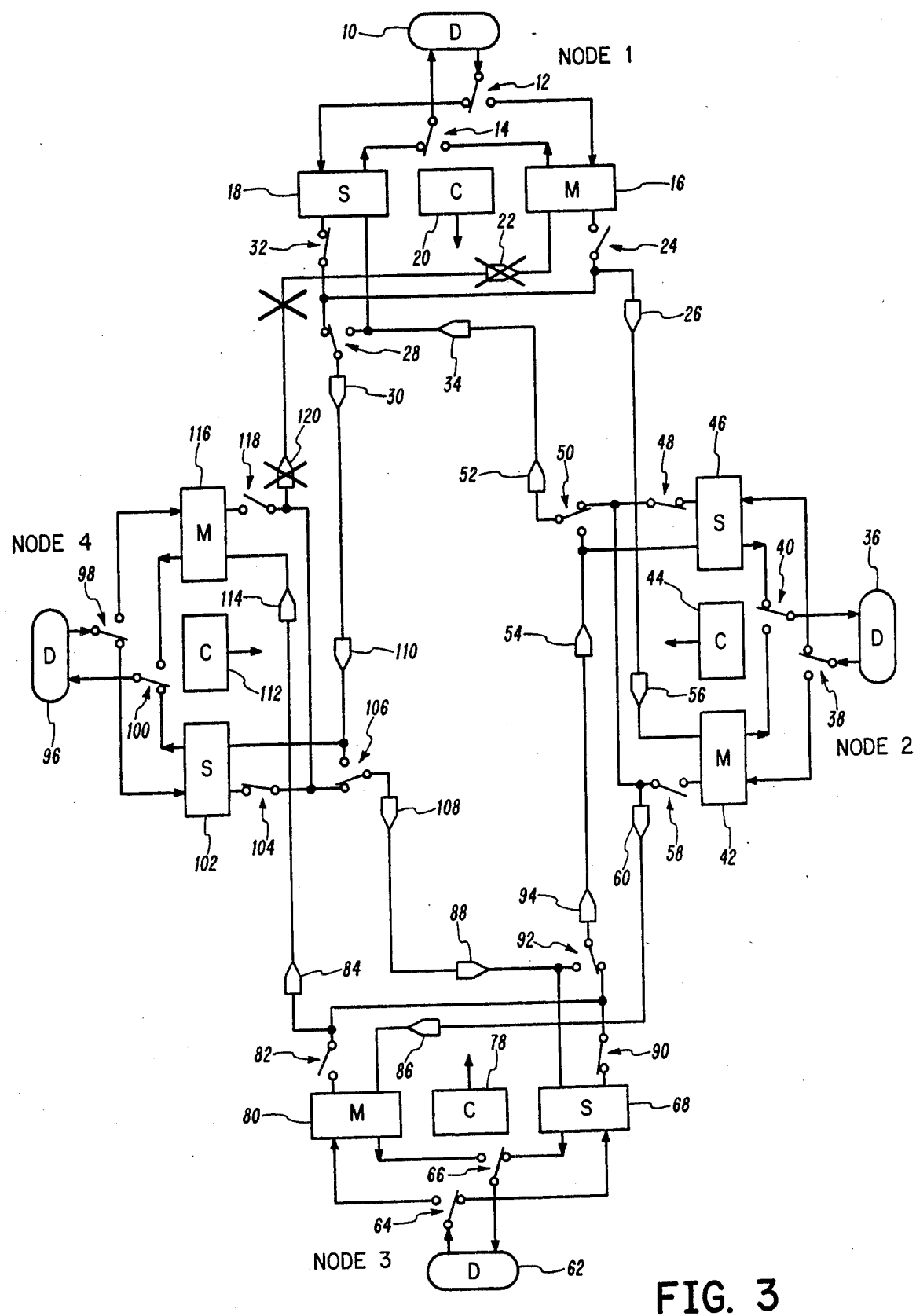
FIG. 3 is a representation of the system of FIG. 1 with the failure shown occurring in only the main loop path between two of the nodes.
Figure 4:
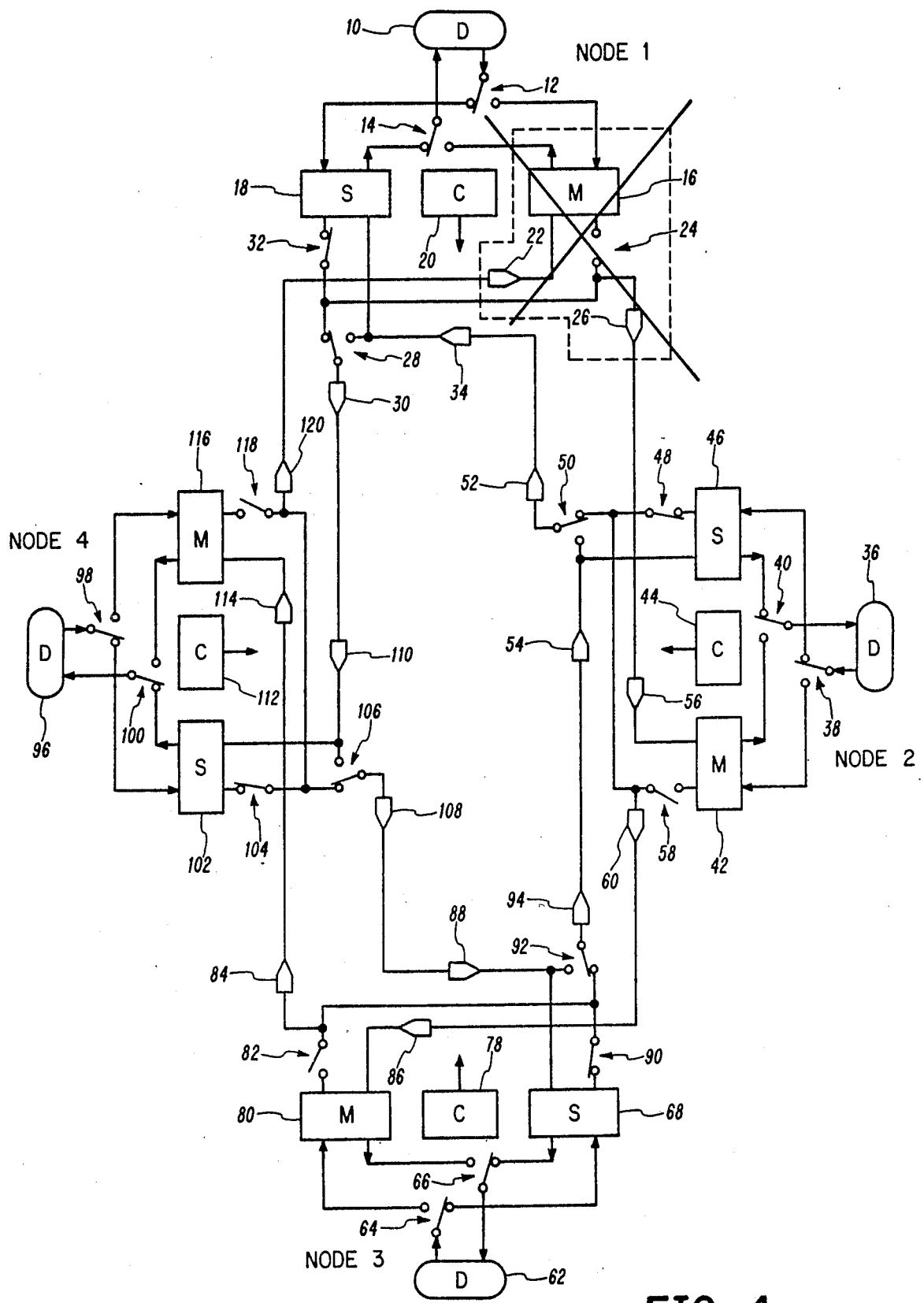
FIG. 4 is a representation of the communication system of FIG. 1 with only the components of a main muldem of a single node being disabled such as by the removal of the printed circuit card containing those components.
Figure 5:
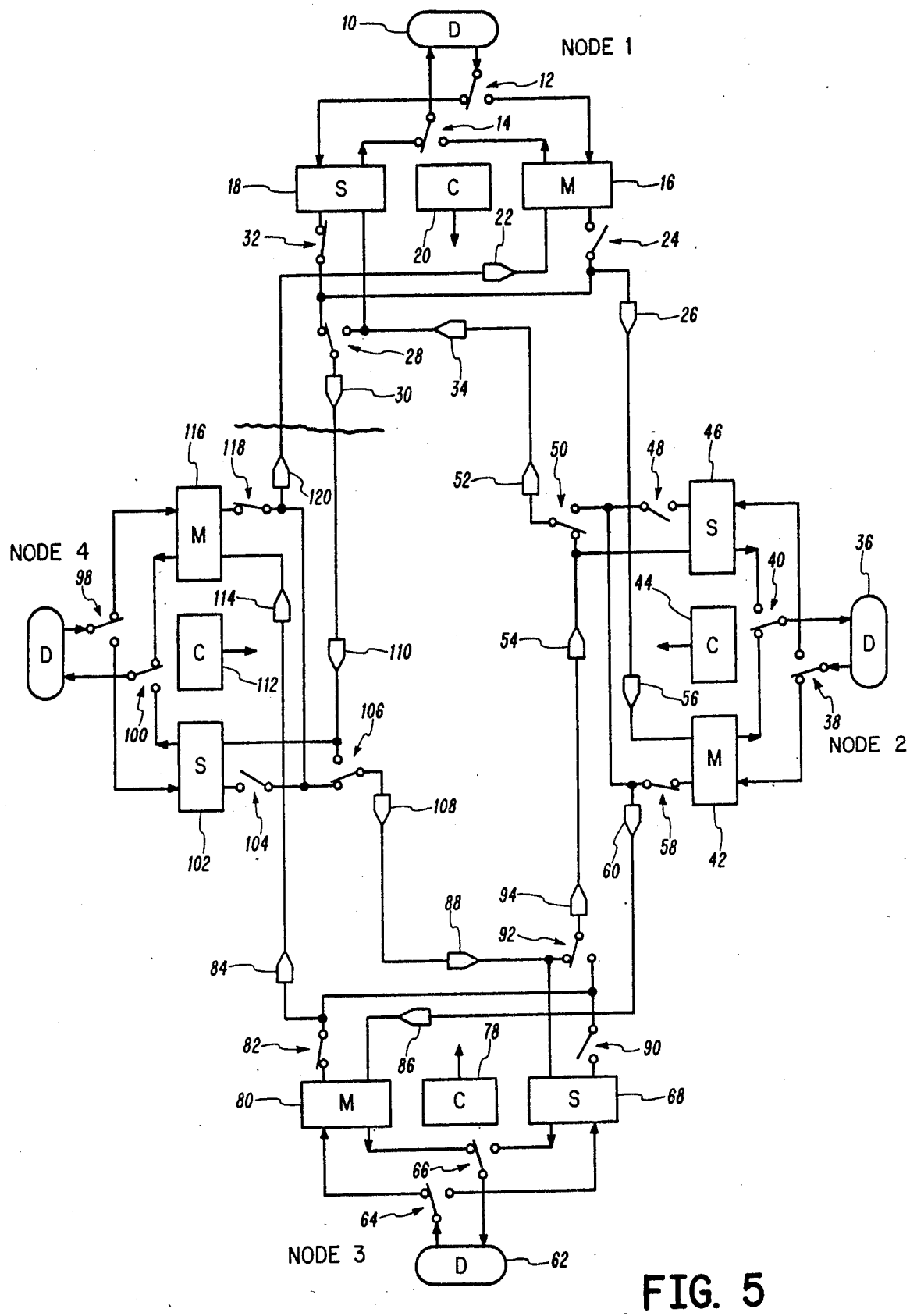
FIG. 5 is an illustration of the reconfiguration of the circuit of FIG. 1 when a break occurs which affects both the main and standby paths between two of the nodes.

In illustrating or describing the inventive concept four general faults will be considered. FIG. 2 shows the connection for a node failure. FIG. 3 shows the connection when there has been a single transmission link failure on the main path, a transmitter failure or a receiver failure on that path. FIG. 4 shows the connection when there is the loss of both the receiver and transmitter for a single node as would be the case when a printed circuit board is removed for maintenance and when the printed circuit board includes the receive and transmit units. FIG. 5 illustrates the connections when both paths are cut between nodes so that neither the main nor standby path is operational between those nodes.

Referring first to FIG. 2, it will be noted that node 1 is completely crossed out to represent a node failure. In this situation, node 2 will detect a lack of signal on the receiver 56 in the main path muldem 42. A local alarm will be set at that node due to loss of input to this receiver 56. The switch 48 along with switches 38 and 40 will be activated so that the standby muldem 46 is activated. In this situation, any signals are sent out the device 46 and signals are transmitted on the standby transmitter 52 as well as the main path transmitter 60. The main path alarm status bit is set to 1 in the overhead data and thus it is transmitted on both the standby path and the main path. However, since node 1 is inoperable, the signal on the standby path is not propagated beyond node 1.

Node 4 will detect a loss of input to the standby receiver 110 by the standby muldem 102. A local alarm will be set in response to this loss. There will be no switch action, since the fault is detected by the standby muldem 102 in combination with its receiver 110. However, the detection of this fault condition will set the standby alarm status bit to a logic 1. The status information is contained in the overhead bits and is transmitted out the muldem 116 and transmitted through the main transmitter 120 and through the standby transmitter 108. Of course, since the node 1 is inoperable, the signals on the main path are dead ended.

Node 3 receives the standby alarm by standby muldem 68 and receives the main alarm in its main muldem 80. The control unit 78 responds to receipt of these two alarm status bits, and in accordance with Table 1 will change the switch 92 to provide a "loop through" condition for the signal being received by receiver 88. In other words, this signal will be bypassed directly to transmitter 94 and forwarded to the standby muldem 46 of node 2. Node 3 will additionally propagate each of the received alarm status bits to the following nodes, in other words, nodes 2 and 4, but because these units are already in a local mode, no further action will be taken by these nodes. The propagation of the alarm status bits only occurs if the node responds to a received alarm signal by some switching action. Thus, neither nodes 2 or 4 will try to further propagate these alarm status bits. In viewing FIG. 2, it will be noted that the unit now has a new closed loop condition where signals are transmitted from standby muldem 46 through transmitters 60 and 86 to the main muldem of node 3. Signals are continued out the transmitter of the muldem 80 through transmitter 84 and receiver 114 of node 4. At node 4, the signals are transmitted by muldem 116 and returned to node 2 via the standby path transmitter 108, the loop through connection of node 3 and return via receiver 54 of node 2 to the standby muldem for completion of the loop.

As illustrated in FIG. 2, a dash line connection with switch 126 may be used to completely bypass the receive and transmitter amplifiers of the standby muldem for their potential failure or for their removal along with the printed circuit card. Either connection is possible and the switch 126 does alleviate further potential problems from the removal of the standby muldem printed circuit card.

An examination of the switch settings of FIG. 2 as compared to a mode failure with the referenced Siecor system will show a similar end result for this type of failure.

FIG. 3 illustrates a single fiber communication link failure between nodes which as shown by the X's in FIG. 3 can be either the main path communication link per se, the transmitter 120 of node 4 or the receiver 22 of node 1.

The loss of any of these three components will result in node 1 raising a local alarm generated due to the loss of input signal to the main muldem 16. The control mechanism 20 of node 1 changes the position of switches 12, 14, 24 and 32 so that it is switched to the standby ring. The main alarm status bit is set and signals are transmitted out the transmit side of standby muldem 18 and supplied through transmitters 26 and 30 to both the main and standby loops, respectively. Node 2 receives the main alarm status bit via receiver 56 and muldem 42 and it changes switches 38, 40, 48 and 58 to cause the node to switch completely to the standby ring. Node 2 propagates the main alarm status bit to the following node since it has taken action in response to receipt of same.

Node 3 receives the main alarm status bit via receiver amplifier 86 and muldem 80 and this node switches to the standby ring so that the switches are as shown as in FIG. 3. Again, the main alarm status bit is propagated to node 4. Although node 4 did receive the alarm signal transmitted by node 1 in the receive section of the standby muldem 102, it only reacts to standby alarms not to main alarms that occur on the standby path. Thus, node 4 is still in the normal mode until it receives the main alarm status bit via receiver 114 and muldem 116. At this time node 4 switches to the standby ring with the switches set as shown in FIG. 3 and the alarm status bit is propagated to node 1. Since node 1 is already in a local mode, it ignores receipt of the signal to switch to standby. Thus it complies with the rules previously stated for the local mode and the remaining nodes comply with the situation in Table 1 of receiving only the main alarm status bit.

This connection of units varies significantly from the referenced Siecor system in that all units are switched to standby since the entire standby loop is operational. This further facilitates the repair of the main transmitter 120 or main receiver 22 since either main printed circuit card can be removed without interfering with system operation. Naturally, the cable can be respliced if that is the only problem and the system will then resume normal operation.

FIG. 4 depicts the connection of the circuit after loss of the main muldem 16 and its receiver and transmitter 22 and 26. This failure commences with the switches set as shown in FIG. 1 and the internal controls within node 1 will transmit signals to cause it to change completely to the standby loop in exactly the same manner as outlined above in connection with FIG. 3.

This again is different from the Siecor approach since in no instance does Siecor use the entire standby loop to the exclusion of the main communication path.

FIG. 5 illustrates the end result or connection of the switches if there is a complete cable cut such as shown between nodes 1 and 4. The ring will reconfigure to a closed loop somewhat similar to that shown by Siecor, but will use the algorithm of the present invention and proceed as follows.

Node 1 will generate a local alarm due to loss of input to the main muldem 16 and its receiver 22, since signals from node 4 are no longer being received. The unit will actuate switches 12, 14, 24 and 32 to switch its output signals to the standby ring after changing to a local mode.

Node 4 will sense the loss of input of signals to the standby muldem 102 and change to the local mode and will set the standby path alarm status bit to a logic 1. The signal will be transmitted via the main muldem 116 and since the cable is cut, it naturally will not be received by node 1, but it will be received via transmitter 108 and receiver 88 of node 3 by the standby muldem 68 and noted by control unit 78. If node 3 receives this standby alarm signal prior to receipt of the main alarm signal, it will merely get ready to change to a "loop through" condition as outlined in Table 1. If it has already received the main alarm signal, it will change switch 92 to the condition shown in FIG. 5 for a "loop through" condition. In any event, it will react to the receipt of the alarm signal and propagate it to node 2. Node 2 acts similarly in receiving the main path alarm status bit from node 1 and switching the switch 50 to a "loop through" condition and propagating this to the following node. Nodes 1 and 4 do not react to receipt of either of these propagated alarm signals since they are already in the local mode and ignore remote control attempts. Nodes 2 and 3 are in the remote mode since they have received the main alarm bit on the main muldems 42 and 80, respectively.

As may be determined from the above, the system operates in accordance with the rules set forth previously and thus the control units such as 20 in node 1 and each of the other control units in the other nodes operate identically in reacting to the various alarms, etc. To provide a different perspective in understanding the system operation, a pseudocode is presented in three different parts below. The first part is the ring control pseudocode which controls the switching within the node to the appropriate main or standby path.

---
RING CONTROL
---
GET_MAIN_STATUS();
CHECK FOR LOCAL ALARM ON THE MAIN
(LA_MAIN);
CHECK FOR MAIN ALARM INPUT ON MAIN;
GET STBY STATUS();
CHECK FOR LOCAL ALARM ON THE STANDBY
(LA_STBY);
CHECK FOR STANDBY ALARM INPUT ON STANDBY;
IF MAIN X_BIT_0_INPUT = 1
(
SET MAIN ALARM = 1;
)
IF STANDBY X_BIT_1_INPUT = 1
(
SET STANDBY ALARM = 1;
)
---

As shown above, the system continually checks both the main and standby muldems as well as the entire node for local alarms and received remote standby and main alarms. If it receives either the main or standby bit in a logic 1 condition, it sets that bit for propagation if other parameters so require.

The control unit then or simultaneously sets the mode for that node as explained supra. This is outlined in the following pseudocode sequence labeled

| SET UP CONTROL MODE FOR RING |
| --- |
| IF ((LA_MAIN = 0) AND (LA_STBY = 0) AND (CONTROL_MODE = LOCAL))<br>(<br>SET CONTROL_MODE = NORMAL;<br>)<br>IF ((MAIN ALARM = 1) AND (CONTROL_MODE = NORMAL) AND (RING ON MAIN));<br>(<br>SET CONTROL_MODE = REMOTE;<br>LOCKOUT MAIN TO STANDBY SWITCH;<br>)<br>IF ((MAIN ALARM = 0) AND (CONTROL_MODE = REMOTE))<br>(<br>CLEAR_LOOPBACK;<br>SWITCH TO MAIN_RING;<br>SET CONTROL_MODE = NORMAL;<br>ENABLE MAIN TO STANDBY SWITCH; (i.e. return to normal state)<br>)<br>IF ((LA_MAIN = 1 OR LA_STBY = 1) AND (CONTROL_MODE = NORMAL))<br>(<br>CONTROL_MODE = LOCAL;<br>) |

As shown, the control mode is set to normal as long as the main and standby path alarm bits are set to a logic 0 and the control mode is local. In other words, the node returns to the normal condition under these parameters. If, however, the main path alarm status bit is set to a logic 1 and the control mode happens to be normal at that time, and the system is operating on the main communication path, the control mode is set to remote and there is a lockout set so that it will not switch to standby. Continuing to follow the pseudo-code, it will be noted that a third condition is where the main alarm status bit is a logic 0 and the control mode is remote, a clear signal is provided to remove any loop back of the standby switch such as 28 or 50, for example, and return the node to the main ring. At the same time, the control mode is returned to normal and the main to standby switch which had previously been locked out is now enabled. Finally, the fourth condition set forth in the above sequence, is where the main or standby alarm signals are received in a logic 1 condition and the control mode is normal and under these situations the control mode is changed to local.

The control system is also periodically cycling through a sequence of events to configure the ring based upon received combinations and values of the alarm. These are set forth in the pseudocode sequence below.

| CONFIGURE THE RING BASED ON THE X-BITS |
| --- |
| IF (CONTROL_MODE = REMOTE)<br>(<br>IF ((MAIN ALARM = 1) AND (STANDBY ALARM = 0)<br>AND (Hs_LOOPBACK = 0))<br>(<br>SWITCH TO STBY_RING;<br>)<br>IF ((MAIN ALARM = 1) AND (STANDBY ALARM = 1))<br>(<br>SWITCH TO MAIN_RING;<br>SET STBY TO LOOP_BACK;<br>)<br>ELSE<br>(<br>CLEAR_LOOPBACK;<br>)<br>) |

If the above sequence determines that the control mode is remote, it will either switch to the standby ring or switch to the main ring and set the standby to loopback for either of the two recited sets of conditions set forth or else clear the loopback so that it can be returned to normal by one of the other sequences.

The final sequence illustrated is the SET THE OUTPUT X-BITS OR ALARM BITS sequence which is believed reasonably self-explanatory in view of the above explanation and the rules provided. Primarily, it checks to see what the present mode is and whether the alarm signal has been received on main or standby so that the bits can either be propagated or not propagated or in the latter situations of this sequence where the alarm bits should be returned to a logic 0 condition, whereby the system can return to the normal state and use the main path entirely.

| SET THE OUTPUT X_BITS |
| --- |
| IF ((CONTROL_MODE = LOCAL) AND (LA_MAIN = 1))<br>(<br>SET MAIN ALARM = 1;<br>)<br>IF ((CONTROL_MODE = LOCAL) AND (LA_STBY = 1))<br>(<br>SET STANDBY ALARM = 1;<br>)<br>IF ((CONTROL_MODE = REMOTE) AND<br>(MAIN ALARM = 1))<br>(<br>SET MAIN ALARM = 1;<br>)<br>IF ((CONTROL_MODE = REMOTE) AND<br>(STANDBY ALARM = 1))<br>(<br>SET STANDBY ALARM = 1;<br>)<br>IF ((CONTROL_MODE = LOCAL) AND (LA_MAIN = 0))<br>(<br>SET MAIN ALARM = 0;<br>)<br>IF ((CONTROL_MODE = LOCAL) AND (LA_STBY = 0))<br>(<br>SET STANDBY ALARM = 0;<br>)<br>IF ((CONTROL_MODE = NORMAL))<br>(<br>SET MAIN ALARM = 0;<br>IF (STANDBY ALARM = 1)<br>SET STANDBY ALARM = 1;<br>ELSE<br>SET STANDBY ALARM = 0;<br>)<br>IF ((CONTROL_MODE = REMOTE) AND<br>(STANDBY ALARM = 0))<br>( |

```
                -continued
            SET THE OUTPUT X_BITS
SET STANDBY ALARM = 0;
)
```

Although the most protection against failure of portions of a communication loop interrupting communications will be obtained from a connection as previously described, a gateway unit such as 206 can be connected in a closed loop system such, as shown in FIG. 7. In this situation, there will be standby path protection from failure of various receivers or transmission lines in exactly the same mode as discussed previously. In other words, there would be standby path protection for the DS3 signals flowing around the main and standby paths of the main loop of FIG. 7. However, there would be no such ring standby path protection for the signals flowing to the DS3 load device 208. The gateway 206 in the mode of FIG. 7 would act exactly as a muldem and react to failures and receipt of alarm status and propagate same in accordance with the rules provided above. No alarm status would be transmitted to or from device 208. However, the remaining signal coming in on either the main or standby path would be transmitted to the device 208. If there was a failure internal to the gateway 206 such that it was no longer operable, a connection such as shown for the appropriate ones of FIGS. 2 through 4 to reestablish communication between the various nodes.

In FIG. 8, there are shown two partial loops on each side of switch 215. Typically, the switch 215 would be connected to many other partial loops not illustrated. The switch 215 then could configure the partial loops into any size total loop desired. In such a situation, the gateways such as 223 through 229 illustrated and those not shown would merely be acting as a device to change lightwave signals coming in on the loop to electrical signals going to the switch 215. A change from electrical signals to lightwave signals would occur on signals received from switch 215. In this mode of operation, the gateway units would be passing any received alarm status bits from input to output and functionally would act as any of the nodes previously described in connection with FIGS. 1 through 5 when there was an internal failure or failure of one or more lines such that the communication loop had to be reconfigured to a new closed loop communication system.

The drawing of FIG. 9 illustrates a further alteration of the basic concept where a gateway unit such as 250 through 264 is used for each of the main and standby paths of four muldems labeled as nodes 1 through 4, or in other words 268, 270, 272 and 274 for the main muldems and nodes A through D for the standby muldems corresponding therewith. Each of these nodes 1A, 2B, 3C and 4D would react to failures in the manner described previously for FIGS. 1 through 5. In FIG. 9, the gateway units are essentially transparent signal type modifiers for converting signals from lightwave to electrical or vice versa. Essentially, they are repeaters and the information contained in the signals are completely transparent to the gateway units. Thus, the concept illustrated in FIG. 9 is that the ring can be expanded indefinitely by connecting all nodes to a centralized transmission network where the end result is a series ring connection of all nodes concerned.

A refinement of the embodiment disclosed in the drawings and the pseudocode, comprised the addition of a manual mode and redefining the local mode as two separate modes of local standby and local main. For the most part, all the processing rules remain the same as outlined previously, except that the main alarm can be set either through the detection of a local receive alarm by the main muldem or by the manual operation thereof. The manual operation thus allows the equipment to be forced into specific modes for testing or repair.

Although we have disclosed a system originally designed to provide reliable communication between various communication nodes using counterrotating lightwave paths operating at DS3 data formats, the concept is not restricted to lightwave signals, and in fact has been described for the most part as merely being any signals, and although the most logical operation would be to have a plurality of nodes communicating over a much higher speed communication link to individual lower frequency equipment, the concept will apply over a wide field of applications. While the concept will operate satisfactorily with only two connected nodes, from a strictly technical standpoint of communicating between sources of information, the advantages of being able to bypass problem areas will not be as significant until three or more nodes are connected in a loop or ring. In view of the above, we wish to be limited not by the specific embodiments shown as examples, but only by the scope of the appended claims.

We claim:

1. A closed loop type data communications network comprising:
   (a) at least two nodes, each node including a receive signal interface means and a transmit signal interface means, a means to transmit data and an alarm means responsive to and for transmitting alarm signals attached to said receive signal interface means and transmit signal interface means;
   (b) main and standby transmission paths connecting said nodes into a ring type transmission circuit;
   (c) a first transmitter and receiver means at each node in the main transmission path adapted, respectively, to transmit and receive data and alarm signals in a first direction around said ring type transmission circuit;
   (d) a second transmitter and receiver means at each node in the standby path normally unbridged one to another, adapted, respectively, to transmit and receive data and alarm signals in a second direction, opposite from said first direction;
   (e) a bridging means in each node for forming a transmission path between the transmitter and receiver on the standby transmission path of each node responsive only to receipt of a predetermined alarm signal originating from an alarm means in another node and received at a given node on the main transmission path; and,
   (f) at least one switching means at each node responsive to the presence of a predetermined alarm status to switch the data paths at each node from a connection where all transmission is on the main transmission path to a connection (1) whereby data and alarm signals are transmitted in part over said standby path and in part over said main path in a closed loop when the transmission failure detected affects both paths OR (2) whereby data and alarm signals are transmitted entirely over said standby path in a closed loop when the transmission failure detected affects only the main path.

2. A ring type communications network comprising in combination:
- at least two nodes, each node including multiplexer means, demultiplexer means, remote data source and receiving means, and alarm means where said alarm means is responsive to signals received by said demultiplexer means and connected to said multiplexer means for transmitting alarm signals therethrough;
- main and standby transmitter means at each node, connected to said multiplexer means whereby signals to be transmitted are received therefrom, for simultaneously transmitting received signals by both transmitter means under normal non-alarm conditions;
- main and standby receiver means at each node, selectively connected, by said alarm means in response to logically decoded signals received said alarm means, to said demultiplexer means for supplying data signals thereto;
- main and standby transmission path means connecting said nodes into two separate ring type transmission circuits for transmitting signals around the loop in opposite directions;
- bridging means at each node, connected to said alarm means and to said standby transmitter means and said standby receiver means, for bridging signals received by said standby receiver means to said standby transmitter means under specific alarm conditions generated at a remote mode alarm means and received on the main transmission path by that node; and,
- detection means associated with said alarm means for either (1) sending logically coded signals whereby all signal transmission is switched to said standby transmission path when a detected failure involves only the main transmission path OR (2) sending logically coded signals whereby bridging of the standby transmitter and receiver means is effected, at nodes which are not adjacent the detected failure, and whereby switching is effected at nodes adjacent the detected failure such that transmission and reception of signals occur on different ones of said main and standby transmission paths when there is a failure involving a portion of both the main and standby transmission paths whereby closed loop flow of data in the system involves the use of both the main and standby transmission paths.

3. A ring type communication system using a plurality of nodes with main and standby ring type transmission paths each connected for transmission of signals in opposite directions around the ring and including switching means in the standby receiver portion of each node responsive to alarm signals for either supplying signals received by the receiver portion operationally to the node or to bridging them to the output of a standby transmitter for transmission to the next node in the ring the improvement comprising in combination:
- first means at each node for detecting whether an alarm condition exists either in a node or in the transmission medium between that node and an adjacent node;
- second means at each node for detecting whether the alarm condition affects the main or the standby transmission path;
- third means at each node for outputting first and second different alarm signals on the main and standby paths respectively in response the detection; and,
- fourth means at each node for detecting said alarm signals and for either (1) switching the node to operationally use the standby path in response to receipt of alarm signals indicating that only the main transmission path is involved with the detected alarm condition, OR (2) switching the standby transmitter-receiver unit to a first mode for bridging signals between said standby transmitter-receiver units when the first alarm signal is received from a remote unit and a local alarm condition is not detected at said node, OR (3) switching the standby transmitter-receiver to a second mode for looping signals through the standby transmission path when a local alarm signal is detected on the main transmission path.

4. A ring type communication system using a plurality of nodes with main and standby ring type transmission paths each connected for transmission of signals in opposite directions around the ring and including switching means in the standby receiver portion of each node responsive to predetermined combinations of alarm signals for changing the node operation whereby the standby transmitter-receiver muldem unit is changed to an operational status rather than the main transmitter-receiver muldem unit or to bridging the standby receiver to the standby transmitter for transmission to the next node in the ring the improvement comprising in combination:
- first means at each node for detecting a local alarm condition and whether the alarm condition affects the main or the standby transmission path;
- second means at each node for outputting either a first or a second different remote alarm signal on the main or standby path respectively in response the local alarm detection if immediately prior to said detection the node was in a normal operating condition;
- third means at each node for changing modes of a node from a normal first mode to a second node upon detection of a local alarm and for changing from the normal first mode to a third mode upon detection of the first remote alarm signal;
- fourth means at each node for switching to use only the transmission path involving standby transmitter-receiver muldem units upon receipt of a local alarm involving the main signal transmission path;
- fifth means at each node operating in said third mode for selectively retransmitting any received remote alarm signals to the next node in the ring in the same path as received in those situations where action is taken at that node in response to the received remote alarm signal; and,
- sixth means at each node operating in said third mode for decoding received remote alarm signals and for either (1) switching the node to operationally use the standby path in response to receipt of only first remote alarm signals OR (2) switching the standby transmitter-receiver muldem unit to a mode whereby signals are bridged therebetween when both the first and second remote alarm signals are received.

5. Node apparatus for use in a ring type communication system comprising main and standby links wherein the direction of data flow is opposite in the main and standby links and wherein the links connect at least three alarm detecting and alarm switching communication nodes in a ring each comprising, in combination:
- main and standby muldems (multiplexer-demultiplexer units) each including multiplexed data input and output means and demultiplexed data input and output means;
- demultiplexed data supply and receiving means;
- multiplexed data main loop transmit first means and standby loop transmit second means each including input means and output means;
- multiplexed data receive third means connected to said main muldem for supplying multiplexed data thereto;
- multiplexed data receive fourth means, including input means and output means, connected to said standby muldem for supplying multiplexed data thereto;
- first switch means connected to said main and standby muldems, said receive third and fourth means and said data supply and receiving means for either,
  (1) in a first control signal condition, connecting said demultiplexed data input and output means to said demultiplexed data supply and receiving means of said main muldem and for connecting said data transmit first and second means to said multiplexed data output means of said main muldem or
  (2) in a second control signal condition, connecting said demultiplexed data input and output means to said demultiplexed data supply and receiving means of said standby muldem and for connecting said data transmit first and second means to said multiplexed data output means of said standby muldem;
- second switch means connected to said first, second and fourth means for either
  (1) in a third control signal condition, connecting said input of said data transmit second means to said input means of said data transmit first means or
  (2) in a fourth control signal condition, connecting said data transmit second means to said data receive fourth means for bypassing received signals from said standby muldem;
- first detection means for detecting predetermined first alarm conditions in said main muldem receive data path and the main muldem circuitry including loss of an entire printed circuit board comprising at least portions of the main muldem and its associated receive and transmit means and for supplying an output first alarm signal for insertion in multiplexed data output by the node in response to the detection of those first conditions;
- second detection means for detecting predetermined second alarm conditions in the receive data path of said standby muldem and for supplying an output second alarm signal for insertion in multiplexed data output by the node in response to the detection of those second conditions; and,
- control means connected to said first and second switch means for normally supplying the first control signal condition to said first switch means and for normally supplying the third control signal condition to said second switch means, said control means further including,
  means for detecting receipt of said second alarm signal by said standby muldem AND receipt of said first alarm signal by said main muldem and for then supplying said fourth control signal condition to said second switch means to change the node to a loop through standby condition in the communication network, and means for detecting receipt of said first alarm signal by said main muldem AND the receipt of said predetermined second alarm conditions at that node and for then supplying said second control signal condition to said first switch means to change the node to a standby condition in the communication network.

6. A distributed intelligence ring or closed loop type communication system using a plurality of nodes each including main and standby closed loop type transmission paths with each transmission path being connected for transmission of signals in opposite directions around the loop and including switching means connected to the standby signal path in each node responsive to alarm signals for switching the node to the use of a standby signal path in the node or for switching leads to bridge receiver and transmitter portions of the standby signal path to create a new ring using both main and standby transmission paths the improvement comprising in combination:
- means in each node for detecting local and remote alarms and for determining whether the alarms relate to main or standby transmission paths;
- means in each node for detecting that received alarms were generated in response to problems only on the main transmission path and for switching each node to the use of only the standby transmission path; and
- means in each node for detecting that received alarms were generated in response to problems with both the main and standby transmission paths and switching the node to a loop through standby or to a standby condition such that a new closed loop is established using portions of the previous standby and main transmission paths.

7. A distributed intelligence ring or closed loop type communication system using a plurality of nodes each including main and standby closed loop type transmission paths with each transmission path being connected for transmission of signals in opposite directions around the loop and including switching means connected to a standby signal path in each node responsive to alarm signals for switching the node to the use of the standby signal path means in the node or for switching leads to bridge receiver and transmitter portions of the standby muldem to create a new closed loop data transmission path, the improvement comprising in combination:
- means in each node for (a) detecting local and remote alarms and (b) determining whether the alarms relate to main or standby transmission paths;
- means in each node for switching signals whereby signals on the standby path are switched to bypass that node after receipt by that node of both main path and standby path remote alarms means in each node for detecting that received alarms were generated in response to problems only on the main transmission path and for switching each node to the use of only the standby transmission path; and,
- means for propagating both main path and standby path remote alarms to the next following nodes when a switching action is taken in response to receipt of said remote alarms.

* * * * *